(12) United States Patent
Waki et al.

(10) Patent No.: US 8,911,152 B2
(45) Date of Patent: Dec. 16, 2014

(54) BEARING

(71) Applicant: Mitsubishi Heavy Industries, Ltd., Tokyo (JP)

(72) Inventors: Yuichiro Waki, Tokyo (JP); Yasuyuki Tatsumi, Tokyo (JP); Hideaki Sato, Tokyo (JP); Hirokazu Shirai, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/762,662

(22) Filed: Feb. 8, 2013

(65) Prior Publication Data

US 2013/0272635 A1   Oct. 17, 2013

(30) Foreign Application Priority Data

Feb. 24, 2012 (JP) ................. 2012-038198

(51) Int. Cl.
  *F16C 17/02* (2006.01)
  *F16C 25/02* (2006.01)
  *F16C 17/03* (2006.01)
  *F16C 35/02* (2006.01)
  *F16C 23/02* (2006.01)

(52) U.S. Cl.
  CPC ............... *F16C 17/02* (2013.01); *F16C 17/03* (2013.01); *F16C 35/02* (2013.01); *F16C 23/02* (2013.01)
  USPC ........................................ 384/129; 384/305

(58) Field of Classification Search
  USPC ................. 384/129, 123, 305–306, 308–309, 384/311–312
  See application file for complete search history.

(56) References Cited

U.S. PATENT DOCUMENTS

| | | | | |
|---|---|---|---|---|
| 3,851,935 A | * | 12/1974 | Stahl | 384/311 |
| 4,597,676 A | * | 7/1986 | Vohr et al. | 384/309 |
| 4,686,403 A | * | 8/1987 | Hackstie et al. | 384/310 |
| 4,765,759 A | | 8/1988 | Le Breton et al. | |

(Continued)

FOREIGN PATENT DOCUMENTS

| | | |
|---|---|---|
| JP | 64-15518 | 1/1989 |
| JP | 64-015518 | 1/1989 |

(Continued)

OTHER PUBLICATIONS

International Search Report issued Mar. 12, 2013 in International (PCT) Application No. PCT/JP2013/053108 with English translation.

(Continued)

*Primary Examiner* — Marcus Charles
(74) *Attorney, Agent, or Firm* — Wenderoth, Lind & Ponack, L.L.P.

(57) ABSTRACT

The bearing device has a support ring positioned around a rotating shaft and a plurality of bearing pads provided between the rotating shaft and the support ring and configured to support the rotating shaft. Some of the plurality of bearing pads are positioned at a lower side of the rotating shaft, and a key member is installed between the support ring and a carrier ring supporting the plurality of bearing pads. The key member is inserted therebetween in a tangential direction of an outer circumference of the carrier ring and is configured to perform positioning of the plurality of bearing pads and the support ring in a radial direction.

8 Claims, 4 Drawing Sheets

(56) References Cited

U.S. PATENT DOCUMENTS

| | | | |
|---|---|---|---|
| 5,215,384 A * | 6/1993 | Maier | 384/312 |
| 5,613,781 A * | 3/1997 | Kuzdzal et al. | 384/312 |
| 7,066,651 B2 * | 6/2006 | Nicholas et al. | 384/99 |

FOREIGN PATENT DOCUMENTS

| | | | |
|---|---|---|---|
| JP | 05332355 A * | 12/1993 | F16C 17/03 |
| JP | 6-37890 | 5/1994 | |
| JP | 6-37891 | 5/1994 | |
| JP | 2001-107953 | 4/2001 | |
| JP | 2004-116659 | 4/2004 | |
| JP | 201015129 A * | 7/2010 | |
| JP | 2011-021541 | 2/2011 | |

OTHER PUBLICATIONS

Written Opinion of the International Searching Authority issued Mar. 12, 2013 in International (PCT) Application No. PCT/JP2013/053108 with English translation.

* cited by examiner

BEARING

TECHNICAL FIELD

The present invention relates to a bearing device, and particularly relates to a bearing device which is used to support a rotor of a rotary machine and makes it easy to secure the concentricity of rotors adjacent to each other in installation, disassembly, and reassembly of the rotary machine.

CROSS REFERENCE TO RELATED APPLICATIONS

Priority is claimed on Japanese Patent Application No. 2012-038198, filed Feb. 24, 2012, the content of which is incorporated herein by reference.

BACKGROUND ART OF THE INVENTION

Conventionally, a bearing device having a plurality of partial pads (that is, tilting pad bearing, and journal bearing) is known as a bearing device applied to support a rotor of a large rotary machine such as a steam turbine, gas turbine, a nuclear power turbine and the like.

As shown in FIG. 4, in the bearing device 101, a bearing body 103 is supported by a support ring 102, and a rotor 4 of a rotary machine is supported by a plurality of bearing pads 109 interspatially positioned along a circumferential direction of the rotor 4 so as to be swingable.

A key member 110 for restricting movement of the bearing body 103 in the radial direction is inserted between the support ring 102 and a carrier ring 108 which forms an outer circumference of the bearing body 103.

For example, the centering of the rotor 4 in the steps of installation, disassembly, and reassembly of the steam turbine, and the readjustment to fix a misalignment of the axis of the rotor 4 due to an external factor such as ground subsidence are performed by changing the thickness of the key member 110 in the rotor radial direction.

Specifically, the positional adjustment of the bearing body 103 is performed by ejecting the bearing body 103 temporarily from the bearing device 101 and adjusting the liner member interposed between the key member 110 and the carrier ring 108. This adjustment operation is performed in an installed state of the rotor 4, and thus, the operation is difficult because the bearing body 103 needs to be elevated while rotating around the rotor 4. In addition, it is necessary to perform a bedding-in of a contacting surface between the support ring 102 and the key members 110 for each adjustment in order to avoid a so-called partial contact where the support ring 102 and the key member 110 are locally in contact with each other.

Patent Document 1 discloses a bearing device provided with a key member configured to be freely insertible and removable in the rotor axial direction in order to facilitate the centering of the rotor 4 (adjusting the alignment of the rotor axis).

PRIOR ART DOCUMENT

Patent Document

Patent Document 1: Japanese Unexamined Patent Publication, First Publication No. S64-15518

DETAILED DESCRIPTION OF THE INVENTION

Problems to be Solved by the Invention

Recently, due to an enlargement of the rotary machine such as the steam turbine or the like, work space around the bearing device is limited, thus it is becoming difficult to insert or remove the key member by the method as disclosed in the Patent Document 1.

The present invention has been made in consideration of the above-mentioned situation, and an object thereof is to provide a bearing device in which the positional adjustment of the rotor can be easily performed even in a case where the size of the rotor device becomes large.

Means for Solving the Problems (1) A bearing device of the present invention includes:
a support ring positioned around a rotating shaft; and
plurality of bearing pads provided between the rotating shaft and the support ring and configured to support the rotating shaft,
wherein some of the plurality of bearing pads are positioned at a lower side of the rotating shaft, and
a key member is installed between the support ring and a carrier ring supporting the plurality of bearing pads, wherein the key member is inserted therebetween in a tangential direction of an outer circumference of the carrier ring and is configured to perform positioning of the plurality of bearing pads and the support ring in a radial direction.

According to the above mentioned constitution, since the key member can be inserted between the support ring and the carrier ring in the tangential direction, positioning of the plurality of bearing pads and the support ring in the radial direction can be easily performed, and thereby the operation time required for positioning them can be reduced.

(2) It is preferable that a face of the key member opposing the carrier ring and the support ring is flat.

According to the above mentioned constitution, insertion of the key member between the carrier ring and the support ring can be more smoothly performed.

(3) It is preferable that the support ring is configured to be dividable into two pieces at a position lower than a horizontal line which passes through the center of the rotating shaft.

According to the above mentioned constitution, a clearance for removing the key member from between the carrier ring and the support ring can be secured. That is, an interference of the key member with a lower half section of the support ring can be prevented, when the key member is removed from between the carrier ring and the support ring.

(4) It is preferable that the key member is placed between the carrier ring and the support ring to restrict relative movement of the carrier ring and the support ring in an axial direction.

Advantageous Effects of the Invention

According to the present invention, since the key member can be inserted between the carrier ring and the support ring in a tangential direction, positioning of the plurality of bearing pads and the support ring in a radial direction can be easily performed by the key member, and thereby an operation time required for positioning them can be reduced.

EMBODIMENTS FOR CARRYING OUT THE INVENTION

An embodiment of the present invention will be explained below with reference to the Figures.

Figure 1:
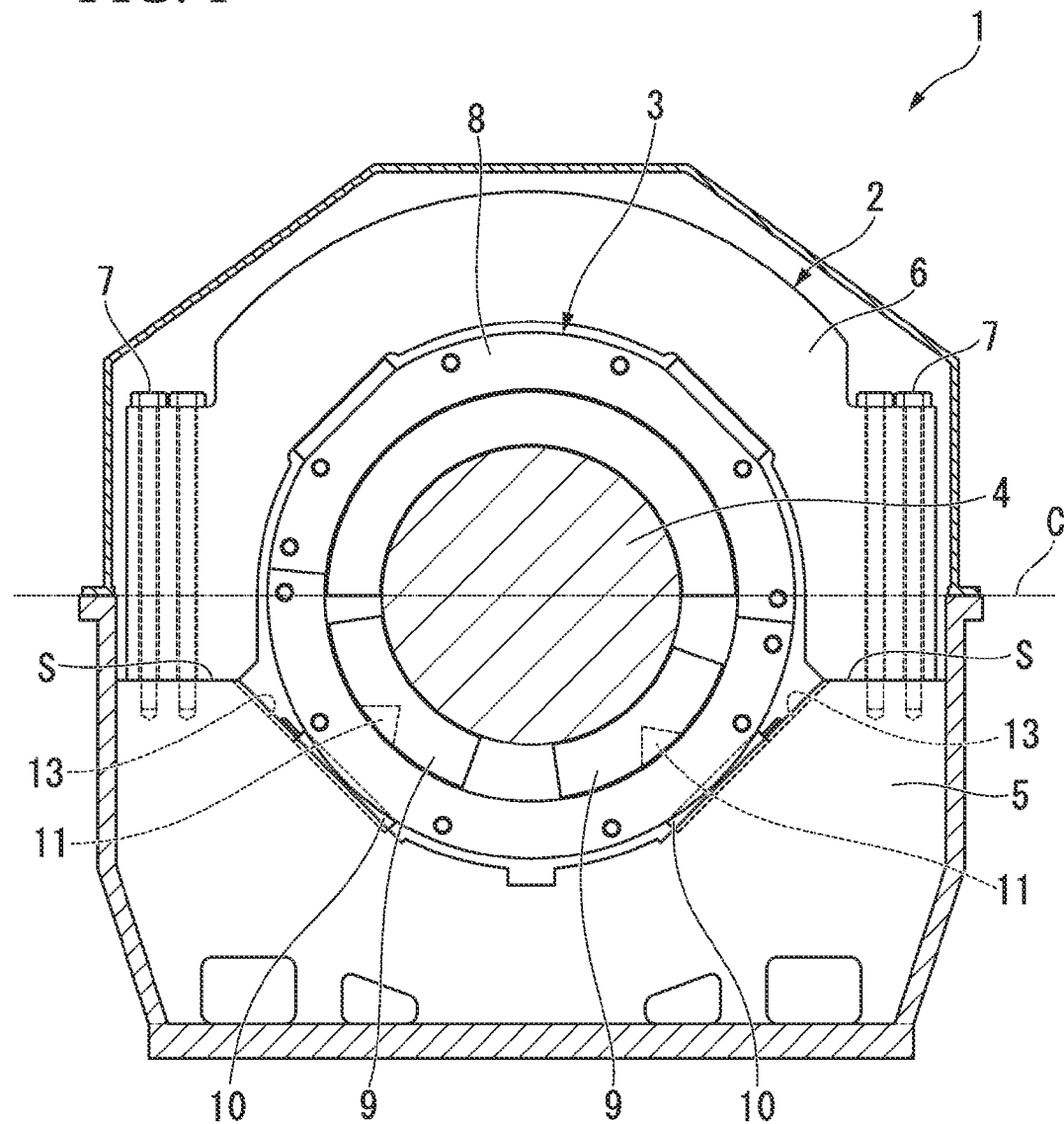
FIG. 1 is a front view of a bearing device according to an embodiment of the present invention.

A bearing device 1 of this embodiment is applied to a steam turbine or the like, and is used to rotatably support a rotor 4 (rotating shaft), which is provided so as to pass through a turbine into which steam flows, in a radial direction thereof. As shown in FIG. 1, the bearing device 1 is equipped with a support ring 2 and a bearing body 3 housed inside the support ring 2.

The support ring 2 is an annular shaped member to be located around the rotor 4 coaxially with the rotor 4, and has a substantially annular ring-shaped inner circumferential surface. The support ring 2 is set on a base plane, and includes a lower half section 5 of the support ring which supports the bearing body 3 from below and a upper half section 6 of the support ring put on the top of the lower half section 5 so as to straddle the rotor 4. The upper half section 6 is fastened to the lower half section 5 by a plurality of bolts 7. That is, the lower and upper half sections 5 and 6 of the support ring 2 can be divided and united at a position lower than a horizontal line which passes through the center of the rotor 4.

Figure 4:
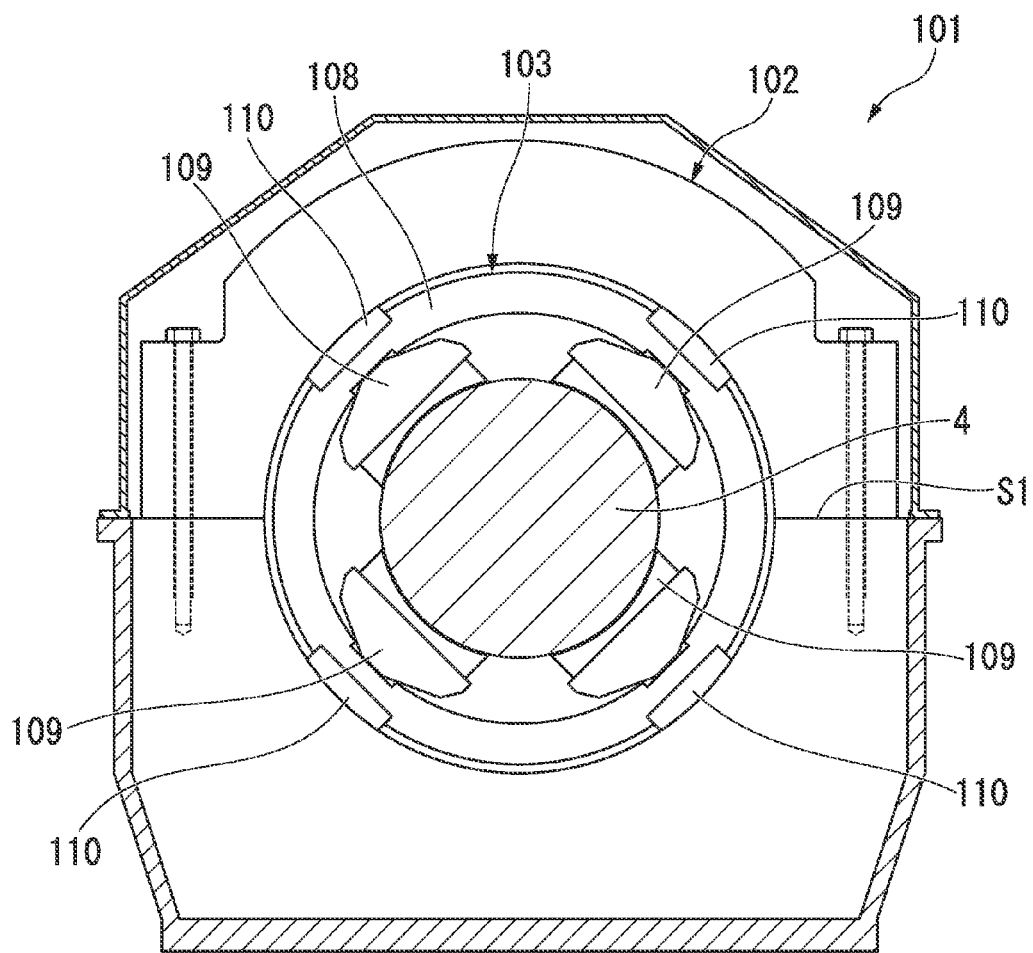
FIG. 4 is a front view of a conventional bearing device.

A division surface S between the lower and upper half sections 5 and 6 is positioned lower than a horizontal surface C including the center of the axis of the rotor 4. In other words, the division surface between the lower and upper half sections 5 and 6 does not coincide with the horizontal surface C. The height of the lower half section 5 is lower than the division surface S1 of the support ring 102 included in the conventional bearing device 101 as shown in FIG. 4.

The bearing body 3 includes an annular shaped carrier ring 8 positioned at an inner circumference side of the support ring 2 and a plurality of bearing pads 9 positioned between the rotor 4 and the carrier ring 8.

A plurality of pivots 11 corresponding to the bearing pads 9 and which swingably support the bearing pads 9 with respect to the carrier ring 8 are formed on an inner circumference surface of the carrier ring 8.

A pair of key members 10 for centering adjustment of the rotor 4 is installed between the bearing body 3 and the support ring 2. Specifically, the pair of the key members 10 is set so as to work together and support the bearing body 3 from the lower side thereof. One of the key members 10 supports the carrier ring 8 having annular shape from the lower side thereof at an angle of 45 degrees, and the other key member 10 is installed to support the opposite side thereof. Here, the angle of 45 degrees is an angle with respect to a vertical cross-section which includes the axis of the rotor 4.

Figure 2:
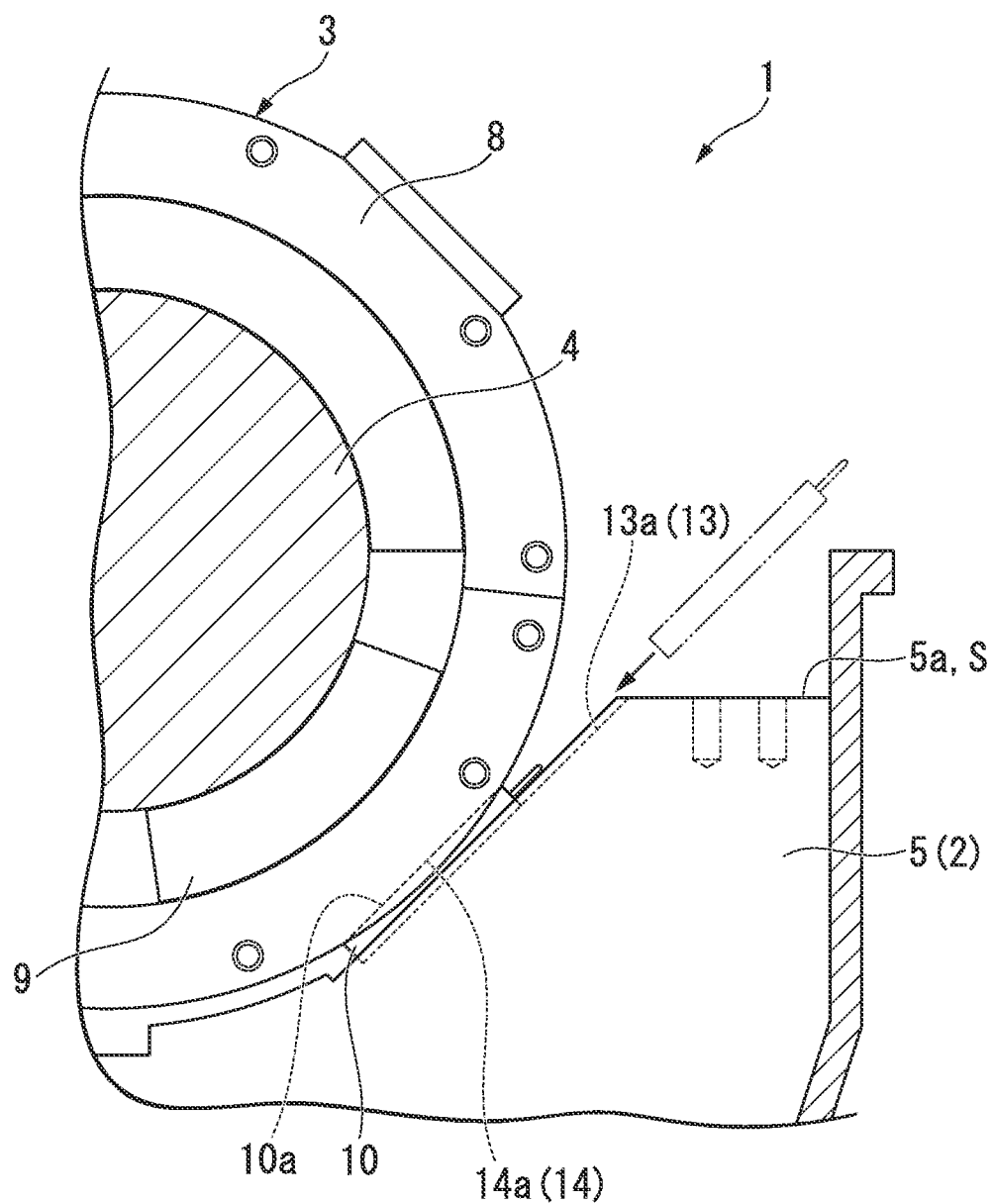
FIG. 2 is an enlarged front view of a main section of the bearing device according to the embodiment of the present invention.

As shown in FIG. 2, the key members 10 are installed so as to be removable in a direction along a tangential line (tangential direction) of an outer circumference of the carrier ring 8. In particular, while slightly elevating the bearing body 3, the key members 10 can be inserted or removed in a direction along one face 10a of the key member 10.

Specifically, first key grooves 13 are formed in the lower half section 5 and second key grooves 14 are formed on the outer circumference of the carrier ring 8. The key member 10 accommodated in a space between a bottom face 13a of the first key groove 13 and a bottom face 14a of the second key groove 14 can be freely inserted or removed in a direction along the bottom faces 13a and 14a.

The bottom face 13a of the first key groove 13 and the bottom face 14a of the second key groove 14 are formed flat, and each of them is inclined at 45 degrees with respect to the horizontal surface.

Figure 3:
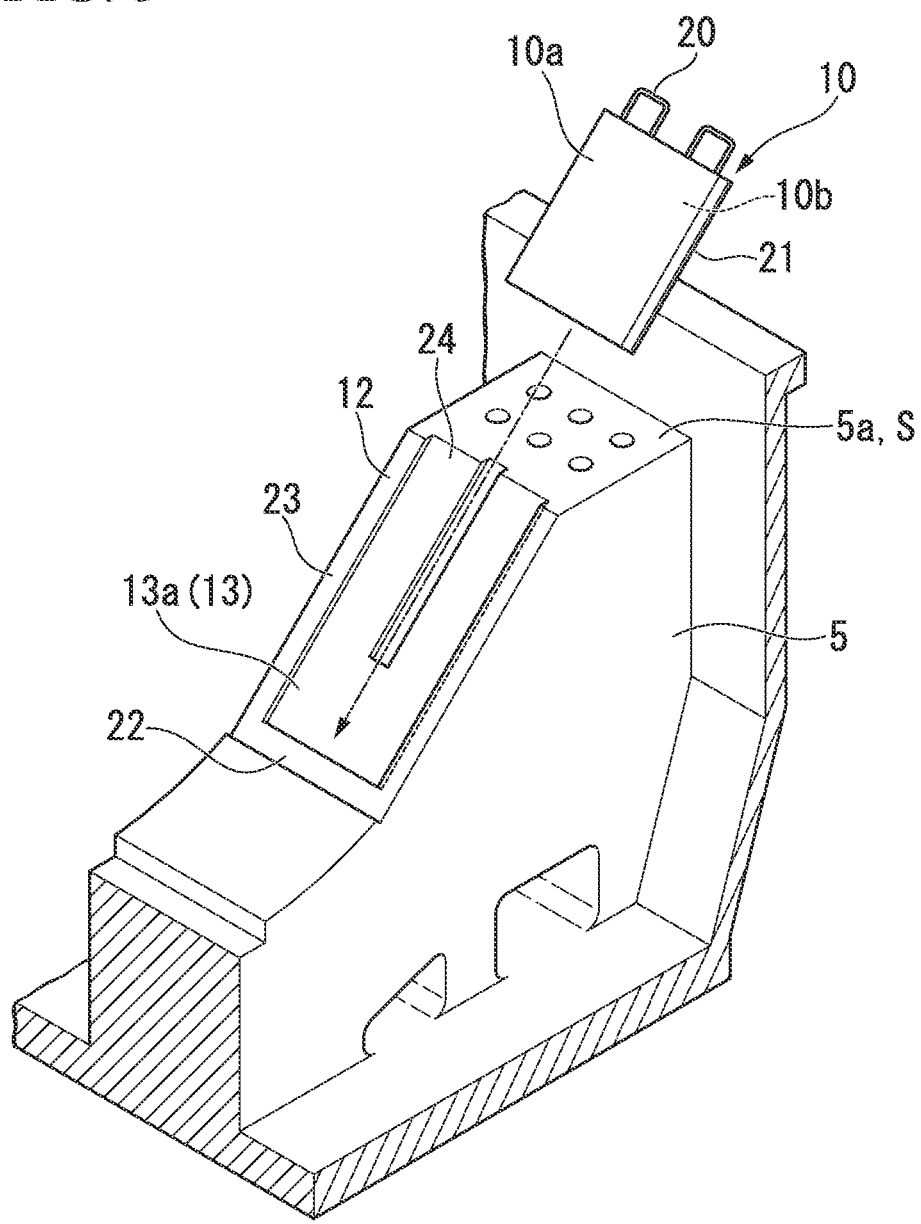
FIG. 3 is a perspective view of a support section of the bearing device according to the embodiment of the present invention.

As shown in FIG. 3, the key member 10 is a plate member having a rectangular shape in planar view with a certain thickness, and includes the one face 10a facing the bearing body 3 and the other face 10b facing the support ring 2.

The one face 10a and the other face 10b are flat surfaces parallel with each other. In addition, the key member 10 is provided with a grasping handle portion 20 which can be gripped for inserting and removing the key member 10.

A liner member 21, which has a certain thickness and of which the shape in planar view is substantially similar to the key member 10, can be attached to the other face 10b of the key member 10. The liner member 21 is attached to the key member 10 using a particular fastening member such as bolts. The height of the rotor 4 can be adjusted by changing the number of the liner members 21 to be attached to the key member 10 or replacing the liner member 21 with another one having a different thickness.

Note that, the liner member 21 may be attached to the one face 10a instead of the other face 10b of the key member 10.

The lower half section 5 has a certain thickness in the axial direction. As shown in FIG. 1, the lower half section 5 supports the bearing body 3 via the surface at the inner circumference side of the support ring 2. As shown in FIG. 3, an inner circumference surface of the lower half section 5 is not formed into an arc-like shape, but is formed from some surfaces.

Thus, the rotor 4 (refer to FIG. 1) is not supported by the entire inner circumferential surface of the lower half section 5, but is supported by a support surface 12 having a rectangular shape with a flat surface. The support surface 12 is installed at 45 degrees with respect to the base plane, and an angle between one support surface 12 and the other support surface 12 installed opposite to the one support surface 12 is 90°.

The first key groove 13 is formed on the support surface 12 so as to have a certain depth. In particular, the first key groove 13 is a rectangular groove formed on the rectangular support surface 12 in accordance with an outline of the support surface 12 and is formed so that the upper side of the first key groove 13 is opened. The depth of the first key groove 13 is smaller than the thickness of the key member 10.

Specifically, the first key groove 13 is demarcated by a lower wall portion 22 restricting the movement of the key member 10 in a downward direction and a guide portion 23 guiding the key member 10 and restricting the movement in the axial direction of the key member 10, when the key member 10 is inserted along the first key groove 13.

As mentioned above, the upper side of the first key groove 13 is opened to form an opening 24. The height level of an upper end of the support surface 12 is substantially equal to an upper surface 5a of the lower half section 5 or slightly lower than the upper surface 5a. Therefore, the key member 10 can be freely inserted or removed obliquely upward along the bottom face 13a of the first key groove 13 in a state where the upper half section 6 is not fastened to the lower half section 5.

Although not shown in the figures, a guide portion for restricting movement of the key member 10 in the axial direction is formed also in the second key groove 14 formed on the carrier ring 8 similarly to the first key groove 13. While inserting the key member 10 between the first and second key grooves 13 and 14, the guide portion guides a side face of the key member 10. After inserting the key member 10, the side face of the key member 10 contacts the guide portion.

The first and second key grooves 13 and 14 are positioned symmetrically as seen from the axial direction of the rotor 4. In the above explanation, only the first key groove 13 which is at one side as seen from the axial direction of the rotor 4 is explained. However, the first and second key grooves 13 and 14 are also formed at the opposite side thereof (refer to FIG. 1).

A procedure for adjusting the height of the rotor 4 will be explained below.

After the upper half section 6 is removed, the bearing body 3 is elevated by a hydraulic lifter or the like, to space between the bearing body 3 and the support ring 2. That is, the bearing body 3 is elevated such that the load of the bearing body 3 and the rotor 4 is not applied to the lower half section of the support ring 2.

Next, by grasping the handle 20, the key member 10 is pulled out and the liner member 21 is adjusted to the desired thickness.

Then, the key member 10 is inserted between the first and second key grooves 13 and 14, and the bearing body 3 is lowered.

According to the above embodiment, since the key member 10 can be inserted between the carrier ring 8 and the support ring 2, the positioning of the bearing pads 9 and the support ring 2 in the radial direction can be easily performed by the key member 10. Accordingly, the operation time for the positioning of the rotor 4 can be made short. Thereby, the installation cost and the adjustment cost can be reduced.

The surface contacting with the carrier ring 8 and the surface contacting with the support ring 2 in the key member 10 are made flat. Thus, the insertion of the key member 10 between the carrier ring 8 and the support ring 2 can be smoothly performed. Moreover, the operation cost can be reduced, because the conditioning operation of the contacting face for each adjustment is not required.

The clearance for removing the key member 10 from between the carrier ring 8 and the support ring 2 can be secured by configuring the division surface S between the lower and upper half sections 5 and 6 to be located lower than the horizontal surface C. That is, an interference of the key member 10 with the lower half section 5 can be prevented when the key member 10 is removed from between the carrier ring 8 and the support ring 2.

It is possible to restrict relative movement of the carrier ring 8 and the support ring 2 in the axial direction in between the carrier ring 8 and the support ring 2, because the guide portion is provided to the first and second key grooves 13 and 14.

The technical scope of the present invention shall not be limited to the above embodiment, and various changes can be made within a scope not departing from the gist of the present invention.

For example, in the above embodiment, both surfaces of the key member are parallel to each other. However, the surfaces of the key member of the present invention shall not be limited to being in parallel. For example, a tapered shape can be adopted such that the distance between the surfaces becomes narrower in the insert direction.

INDUSTRIAL APPLICABILITY

The present invention relates to a bearing device, and particularly to the bearing device which is used to support a rotor of a rotary machine and makes it easy to secure the concentricity of rotors adjacent to each other in installation, disassembly, and reassembly of the rotary machine.

DESCRIPTION OF NUMERAL SIGNS

1: Bearing Device
2: Support Ring
3: Bearing Body
4: Rotor (Rotating Shaft)
5: Lower Half Section of Support Ring
6: Upper Half Section of Support Ring
8: Carrier Ring
9: Bearing Pad
10: Key Member
13: First Key Groove
14: Second Key Groove

The invention claimed is:

1. A bearing device comprising:
a support ring positioned around a rotating shaft;
a plurality of bearing pads provided between the rotating shaft and the support ring and configured to support the rotating shaft;
a carrier ring supporting the plurality of bearing pads; and
a key member installed between the support ring and the carrier ring to perform positioning of the plurality of bearing pads in a radial direction of the rotating shaft with respect to the support ring, wherein
some of the plurality of bearing pads are positioned at a lower side of the rotating shaft,
an inner circumference surface of the support ring includes a flat support surface that is inclined with respect to a base plane and supports the carrier ring from below,
the flat support surface of the support ring has a key groove with an opening that faces obliquely upward, the key member being removably insertable into the key groove along a bottom face of the key groove, and
the key member is installed to the key groove by inserting the key member to the key groove in a tangential direction of an outer circumference of the carrier ring via the opening.

2. The bearing device according to claim 1, wherein
a face of the key member opposing the carrier ring and the support ring is flat.

3. The bearing device according to claim 2, wherein
the support ring is configured to be dividable at a position lower than a horizontal line which passes through a center of the rotating shaft.

4. The bearing device according to claim 3, wherein
the key member is placed between the carrier ring and the support ring to restrict relative movement of the carrier ring and the support ring in an axial direction.

5. The bearing device according to claim 2, wherein
the key member is placed between the carrier ring and the support ring to restrict relative movement of the carrier ring and the support ring in an axial direction.

6. The bearing device according to claim 1, wherein
the support ring is configured to be dividable at a position lower than a horizontal line which passes through a center of the rotating shaft.

7. The bearing device according to claim 6, wherein
the key member is placed between the carrier ring and the support ring to restrict relative movement of the carrier ring and the support ring in an axial direction.

8. The bearing device according to claim 1, wherein the key member is placed between the carrier ring and the support ring to restrict relative movement of the carrier ring and the support ring in an axial direction.

* * * * *